(12) United States Patent
Takamura et al.

(10) Patent No.: US 8,496,084 B2
(45) Date of Patent: Jul. 30, 2013

(54) THROTTLE SENSOR MOUNTING STRUCTURE

(75) Inventors: Toshiaki Takamura, Wako (JP); Hiroshi Maeda, Wako (JP); Yusuke Funayose, Wako (JP); Masao Yoshinaga, Wako (JP); Sho Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/428,457

(22) Filed: Mar. 23, 2012

(65) Prior Publication Data

US 2012/0241241 A1 Sep. 27, 2012

(30) Foreign Application Priority Data

Mar. 25, 2011 (JP) ................. 2011-068569

(51) Int. Cl.
*B62K 23/04* (2006.01)
(52) U.S. Cl.
USPC ............ 180/335; 180/219; 123/376; 123/399
(58) Field of Classification Search
USPC .................. 180/219, 315, 335, 336; 123/376, 123/399, 400; 74/500.5, 502.4
See application file for complete search history.

(56) References Cited

U.S. PATENT DOCUMENTS

| | | | | |
|---|---|---|---|---|
| 6,907,954 B2* | 6/2005 | Tanaka | | 180/335 |
| 7,431,013 B2* | 10/2008 | Hotta et al. | | 123/399 |
| 7,950,367 B2 | 5/2011 | Yoshizawa | | |
| 7,958,867 B2* | 6/2011 | Yoshizawa | | 123/399 |
| 8,051,939 B2* | 11/2011 | Kondo et al. | | 180/219 |
| 2003/0217612 A1 | 11/2003 | Tanaka | | |
| 2005/0211220 A1* | 9/2005 | Matsuda | | 123/336 |
| 2006/0243447 A1* | 11/2006 | McElroy et al. | | 166/301 |
| 2009/0071437 A1* | 3/2009 | Samoto et al. | | 123/399 |
| 2009/0095254 A1* | 4/2009 | Yamada | | 123/337 |

FOREIGN PATENT DOCUMENTS

| | | |
|---|---|---|
| EP | 2 048 350 A2 | 4/2009 |
| JP | 2003-267284 A | 9/2003 |
| JP | 2008-274925 A | 11/2008 |

* cited by examiner

*Primary Examiner* — Joseph Rocca
*Assistant Examiner* — Darlene P Condra
(74) *Attorney, Agent, or Firm* — Birch, Stewart, Kolasch & Birch, LLP

(57) ABSTRACT

A throttle sensor mounting structure for suppressing the influence on the arrangement of a lighting device located on the front side of a head pipe. A throttle sensor mounting structure in a saddle seat type vehicle includes a handle, a throttle grip rotatably mounted on the handle, a throttle sensor for detecting an operational amount of the throttle grip, a controller for controlling a power unit according to a detection value from the throttle sensor, a pair of right and left main frames extending to the rear from a head pipe, and a headlight provided on the front side of the head pipe. The throttle sensor is located on the rear side of the head pipe and between the right and left main frames so as to be superimposed on the main frames as viewed in a side elevation.

17 Claims, 13 Drawing Sheets

THROTTLE SENSOR MOUNTING STRUCTURE

CROSS-REFERENCE TO RELATED APPLICATIONS

The present application claims priority under 35 USC 119 to Japanese Patent Application No. 2011-068569 filed Mar. 25, 2011 the entire contents of which are hereby incorporated by reference.

BACKGROUND OF THE INVENTION

1. Field of the Invention

The present invention relates to a throttle sensor mounting structure in a saddle seat type vehicle.

2. Description of Background Art

A motorcycle is known that includes a configuration such that the opening angle of an accelerator throttle provided on a handle is converted into an electrical signal. The output from a power unit, such as a motor and an engine, is controlled according to this electrical signal. See, for example, Japanese Patent Laid-Open No. 2003-267284.

However, in the conventional motorcycle mentioned above, a body frame is not provided on the front side of a head pipe, so that consideration must be made to protect a throttle angle sensor. Further, not only electric equipment such as a headlight, but also rotating members of a steering system such as front forks are provided on the front side of the head pipe. Accordingly, it is difficult to ensure a sufficient space for locating the throttle angle sensor on the front side of the head pipe.

SUMMARY AND OBJECTS OF THE INVENTION

It is accordingly an object of an embodiment of the present invention to provide a throttle sensor mounting structure that can suppress the influence on the arrangement of a lighting device located on the front side of a head pipe.

According to an embodiment of the present invention, there is provided a throttle sensor mounting structure in a saddle seat type vehicle including a handle (8), a throttle grip (52a) rotatably mounted on the handle (8), a throttle sensor (52) for detecting an operational amount of the throttle grip (52a), a controller (44, 48) for controlling a power unit (3) according to a detection value from the throttle sensor (52), and a pair of right and left main frames (13) extending to the rear from a head pipe (12); wherein the throttle sensor (52) is located on the rear side of the head pipe (12) and between the right and left main frames (13) so that at least a part of the throttle sensor (52) is superimposed on the main frames (13) as viewed in a side elevation.

According to an embodiment of the present invention, the throttle sensor (52) has a potentiometer (52e); the axis (L1) of a rotating shaft (52i) of the potentiometer (52e) extends in the longitudinal direction of the vehicle; and a throttle cable (52b) for connecting the throttle grip (52a) and the potentiometer (52e) is routed through the front side of the head pipe (12) toward the rear side of the head pipe (12).

According to an embodiment of the present invention, the axis (L1) of the rotating shaft (52i) is perpendicular to the axis (L2) of the head pipe (12) as viewed in side elevation.

According to an embodiment of the present invention, an external connection terminal (19a) of a driving battery (2) is located on the right or left side of a laterally central line (CL) of the vehicle; and the axis (L1) of the rotating shaft (52i) is located on the same side as the side where the external connection terminal (19a) is located with respect to the laterally central line (CL).

According to an embodiment of the present invention, the throttle sensor (52) is located so as to fall within the vertical size of the head pipe (12).

According to an embodiment of the present invention, the driving battery (2) is located between the right and left main frames (13) so as to cross the main frames (13) as viewed in side elevation. The throttle sensor (52) is located in an area surrounded by the front surface (2A) of the driving battery (2), the right and left main frames (13), and the head pipe (12).

According to an embodiment of the present invention, openings (13b) are formed at the front portions of the right and left main frames (13); and the throttle sensor (52) is exposed to the openings (13b) as viewed in a side elevation.

According to an embodiment of the present invention, a headlight (10) is provided on the front side of the head pipe (12).

According to an embodiment of the present invention, the throttle sensor is located between the right and left main frames extending to the rear from the head pipe so as to be superimposed on the main frames as viewed in a side elevation. Accordingly, the right and left sides of the throttle sensor are covered with the main frames, so that it is possible to prevent that an external force may be applied to the throttle sensor from the right and left sides thereof, thereby protecting the throttle sensor. Further, the throttle sensor is located on the rear side of the head pipe. Accordingly, the throttle sensor has no influence on the arrangement of a headlight, and the influence on the steering operation can be suppressed. In the case that the vehicle is a sport type motorcycle, the degree of lateral divergence of the right and left main frames is large, so that a dead space is formed between the head pipe and a driving battery located between the right and left main frames. Accordingly, the throttle sensor can be located by effectively using this dead space.

According to an embodiment of the present invention, the axis of the rotating shaft of the potentiometer extends in the longitudinal direction of the vehicle, and the throttle cable is routed through the front side of the head pipe toward the rear side of the head pipe. Accordingly, the throttle cable can retain sufficient flexibility, so that the application of a large bending force to the throttle cable in the steering operation can be suppressed.

According to an embodiment of the present invention, the axis of the rotating shaft of the potentiometer is perpendicular to the axis of the head pipe. Accordingly, the throttle cable for connecting the throttle grip and the throttle sensor can be flexed in different directions at at least two positions, i.e., on the front side and the rear side of the head pipe. As a result, in the steering operation, it is possible to reduce a compressive or extensive force applied to a connecting portion of the throttle sensor to which the throttle cable is connected. Accordingly, as compared with the case that the axis of the rotating shaft of the potentiometer is not perpendicular to the axis of the head pipe, the influence due to the displacement of the throttle cable in the steering operation can be suppressed.

According to an embodiment of the present invention, the axis of the rotating shaft of the potentiometer and the external connection terminal of the driving battery are located on the right or left side of the laterally central line of the vehicle. Accordingly, the maintenance of the throttle sensor and the external connection terminal of the driving battery can be performed from the same side with respect to the laterally central line.

According to an embodiment of the present invention, the throttle sensor is located so as to fall within the vertical size of the head pipe. Accordingly, the dead space immediately on the rear side of the head pipe can be effectively used.

According to an embodiment of the present invention, the driving battery is located between the right and left main frames so as to cross the main frames as viewed in side elevation. Further, the throttle sensor is located in the area surrounded by the front surface of the driving battery, the main frames, and the head pipe. Accordingly, it is possible to prevent that an external force may be applied to the throttle sensor from the front side, the right and left sides, and the rear side thereof, thereby protecting the throttle sensor more reliably. Further, the dead space between the driving battery and the main frames can be effectively used.

According to an embodiment of the present invention, the openings are formed at the front portions of the right and left main frames. Accordingly, the weight of the main frames can be reduced and the throttle sensor can be accessed through the openings, thereby improving the maintainability.

According to an embodiment of the present invention, even in the case that the headlight is located on the front side of the head pipe and it is therefore difficult to ensure a sufficient space for locating the throttle sensor on the front side of the head pipe, a sufficient space for locating the throttle sensor can be ensured on the rear side of the head pipe.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will now be described with reference to the drawings. The terms of "front," "rear," "right," "left," etc. in the following description mean the directions as viewed from an operator riding on a vehicle to be hereinafter described unless otherwise specified. Further, in some of the drawings, there are suitably shown an arrow FR indicating the front side of the vehicle, an arrow LH indicating the left side of the vehicle, and an arrow UP indicating the upper side of the vehicle.

Figure 1:
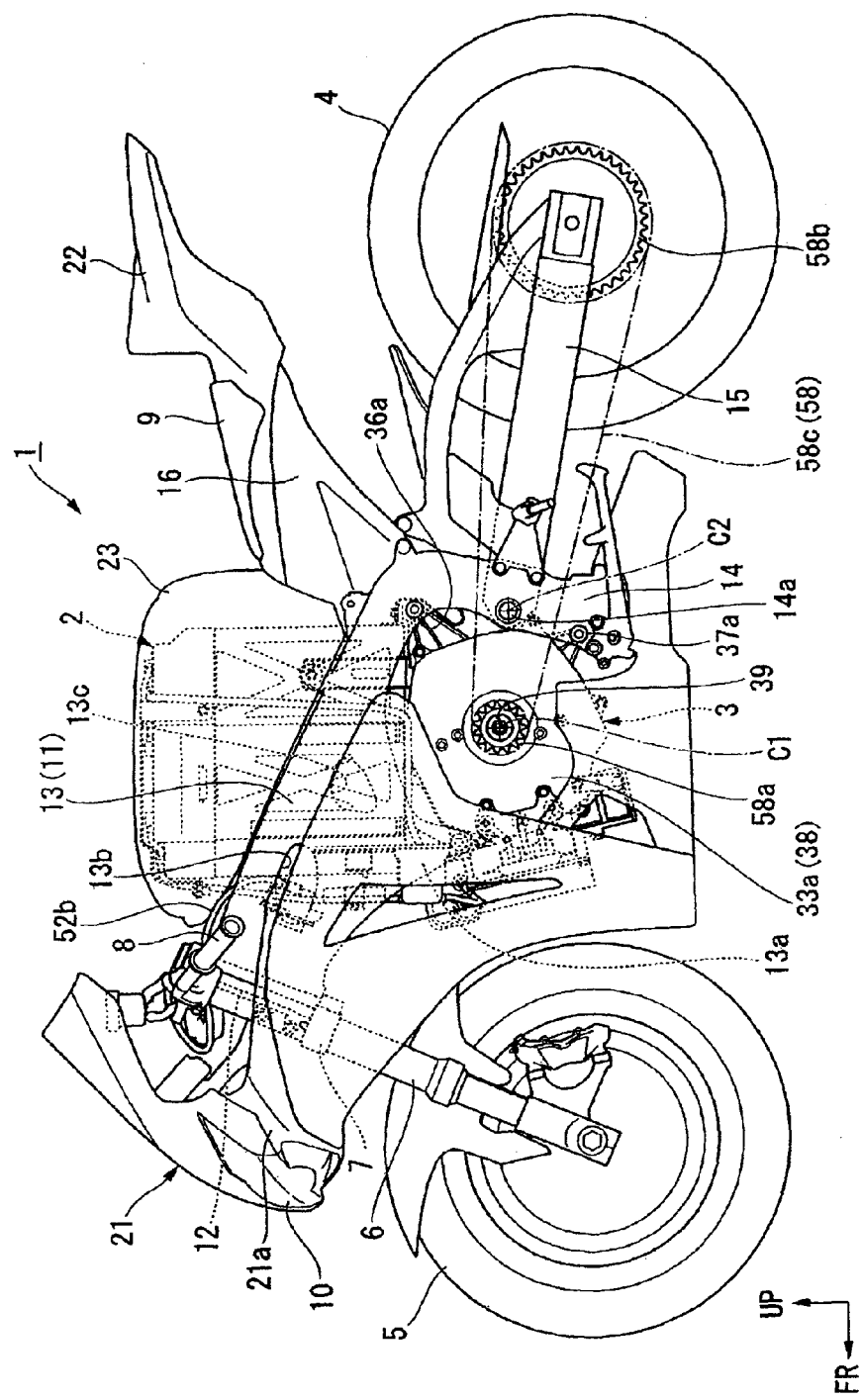
FIG. 1 is a left side view of a sport type saddle seat type electric vehicle according to a preferred embodiment of the present invention.
Figure 2:
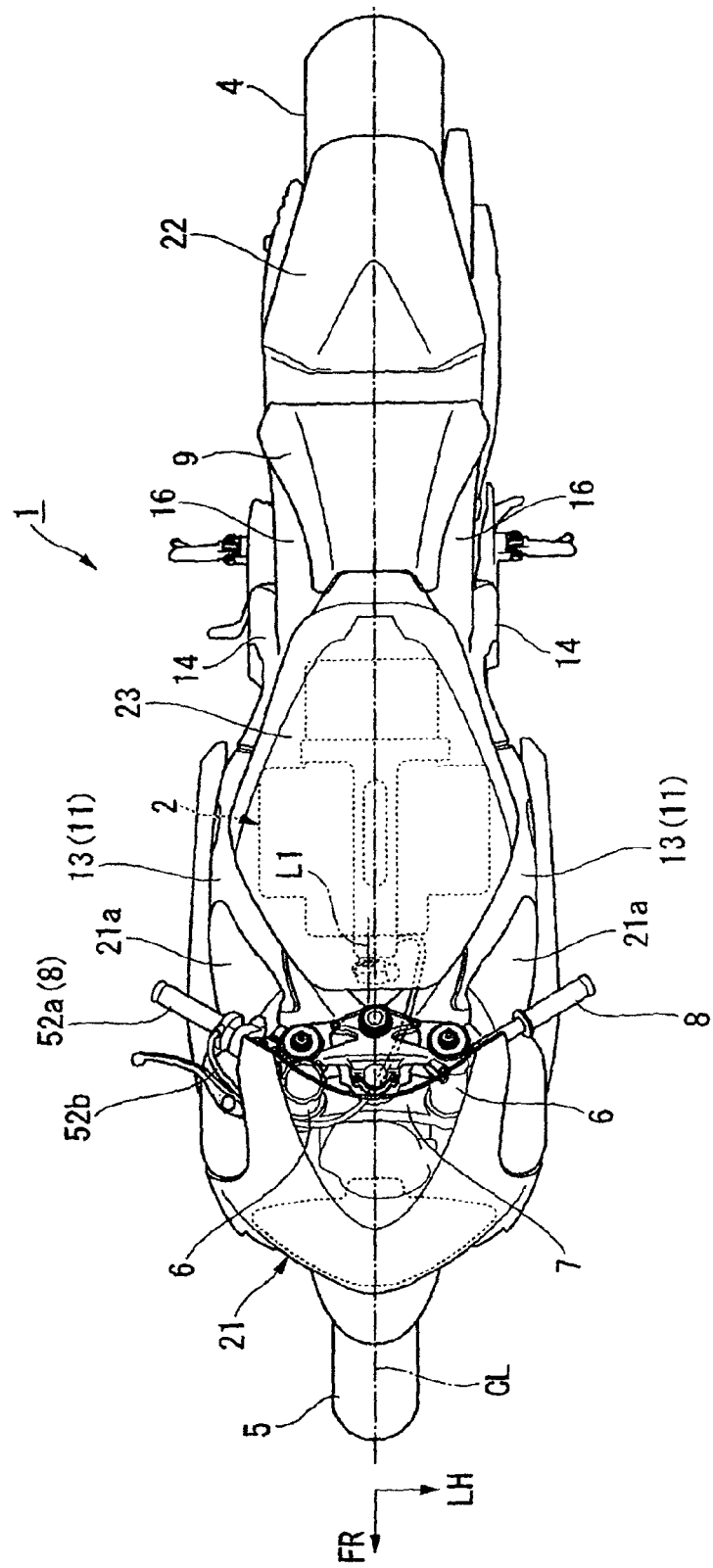
FIG. 2 is a top plan view of the saddle seat type electric vehicle.

As shown in FIGS. 1 and 2, a sport type saddle seat type electric vehicle 1 is provided with a main battery 2 at a central upper portion of the vehicle body and a drive motor (motor unit) 3 positioned at a central lower portion of the vehicle body. The drive motor 3 is driven by the electric power from the main battery 2, and the drive force from the drive motor 3 is transmitted to a rear wheel 4 as a drive wheel, thereby operating the vehicle.

The saddle seat type electric vehicle 1 has a cowling 21 for fully cowling the front portion of the vehicle body to the rear lower portion of the vehicle body. In this preferred embodiment, the saddle seat type electric vehicle 1 is configured as a sport type motorcycle capable of being operated in performing sports at high speeds (corresponding to a motorcycle having a parallel four-cylinder engine with a displacement of 250 to 400 cc). A front wheel 5 is supported through an axle to the lower end portions of a pair of right and left front forks 6. The upper portions of the right and left front forks 6 are steerably supported through a steering stem 7 to a head pipe 12 forming the front end of a body frame 11. A steering handle 8 is mounted to the upper portion of the steering stem 7 (or the front forks 6).

A pair of right and left main frames 13 extend to the rear from the head pipe 12 so as to be inclined downwardly, and a pair of right and left pivot frames 14 extend downwardly from the rear end portions of the right and left main frames 13, respectively. A swing arm 15 is vertically swingably supported at its front end portion through a pivot shaft 14a to the right and left pivot frames 14, and the rear wheel 4 is supported through an axle to the rear end portions of the swing arm 15. Thus, the body frame 11 is configured as a twin-tube frame.

The front portion of the vehicle body of the saddle seat type electric vehicle 1 is covered with the cowling 21 on the front side, right and left sides, and lower side of the vehicle. A headlight 10 for illuminating the front side of the vehicle from a front opening of the cowling 21 is located on the front side of the head pipe 12. The headlight 10 is supported through stays to the cowling 21 and the head pipe 12. The main battery 2 is mounted between the right and left main frames 13, and the drive motor 3 is mounted below the right and left main frames 13. A pair of right and left motor hangers 13a extend downwardly from the front lower portions of the right and left main frames 13, respectively, and the front portion of the drive motor 3 is supported to the lower end portions of the right and left motor hangers 13a.

A pair of right and left seat frames 16 extend to the rear from the rear end portions of the right and left main frames 13 and the upper end portions of the right and left pivot frames 14 so as to be inclined upwardly. A seat 9 for the operator is supported on the right and left seat frames 16. The seat frames 16 are surrounded by a seat cowl 22. The body frame 11 including the seat frames 16 is formed by integrating a plurality of kinds of metal members by welding, fastening, etc.

A seat front cover 23 is located on the front side of the seat 9 so as to project upward from the upper edges of the right and left main frames 13. The seat front cover 23 is adapted to be gripped by the knees of the operator sitting on the seat 9. The upper portion of the main battery 2 is accommodated in the seat front cover 23.

Figure 3:
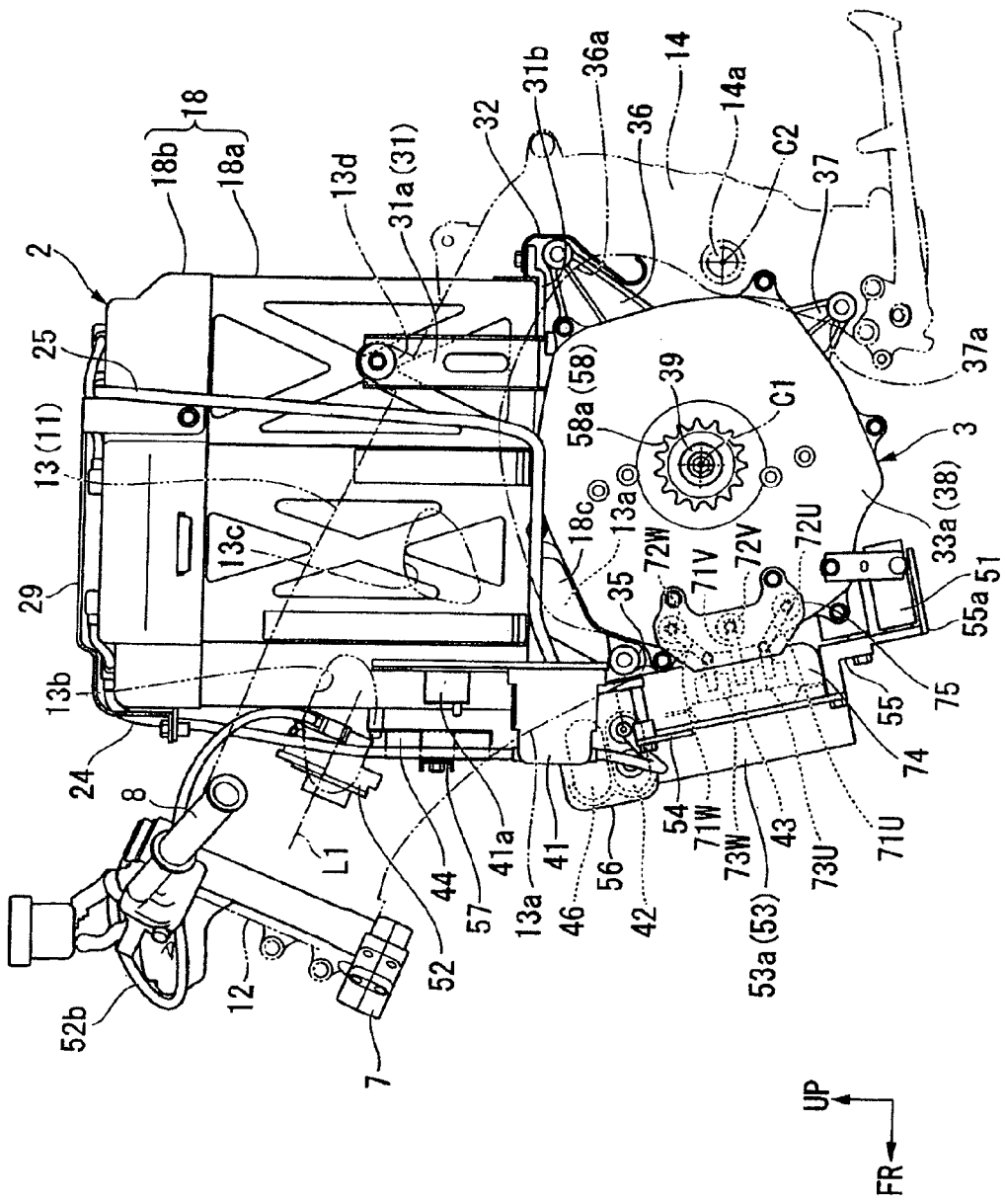
FIG. 3 is a left side view of an essential part of the saddle seat type electric vehicle.
Figure 4:
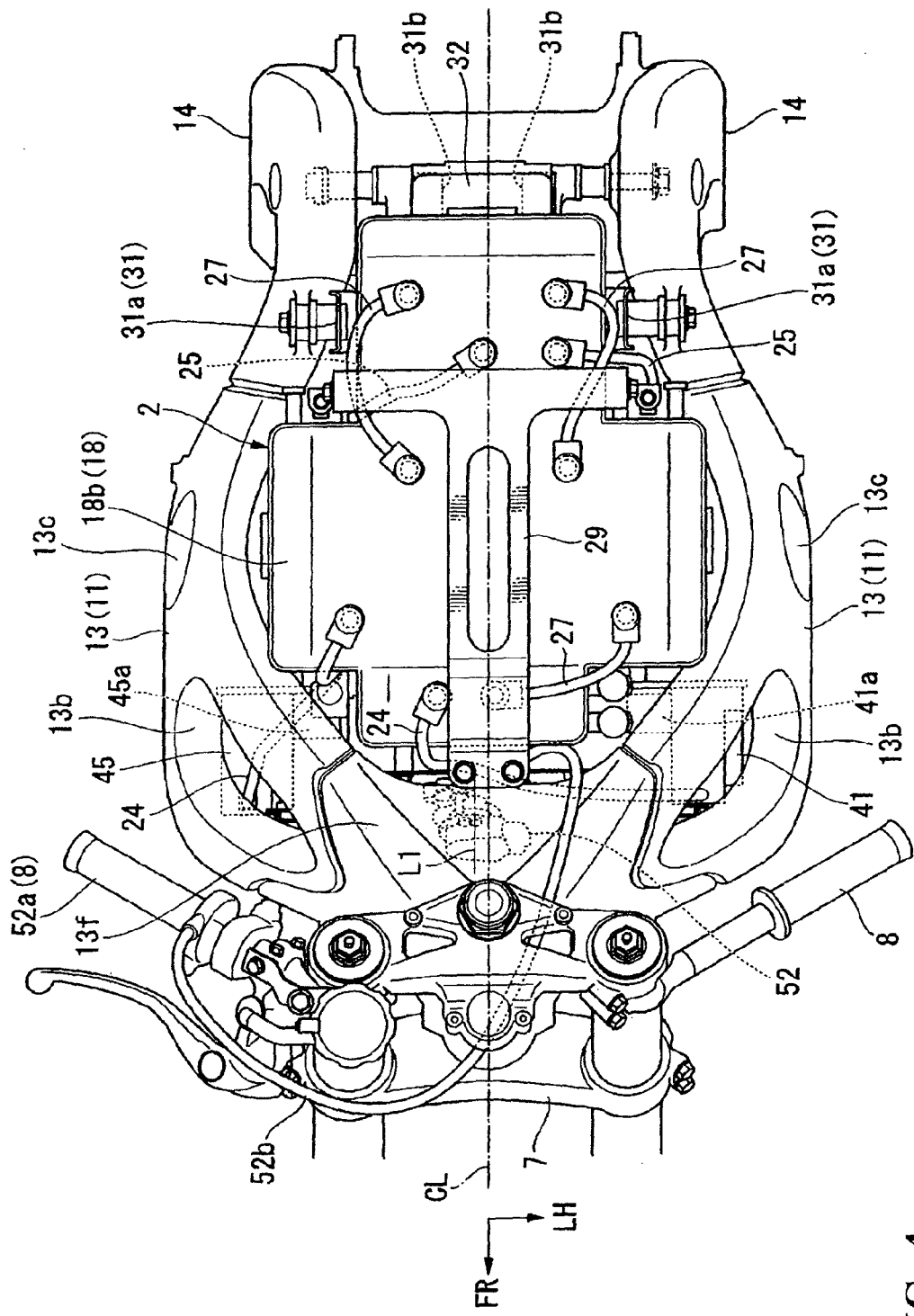
FIG. 4 is a top plan view of the essential part of the saddle seat type electric vehicle.
Figure 8:
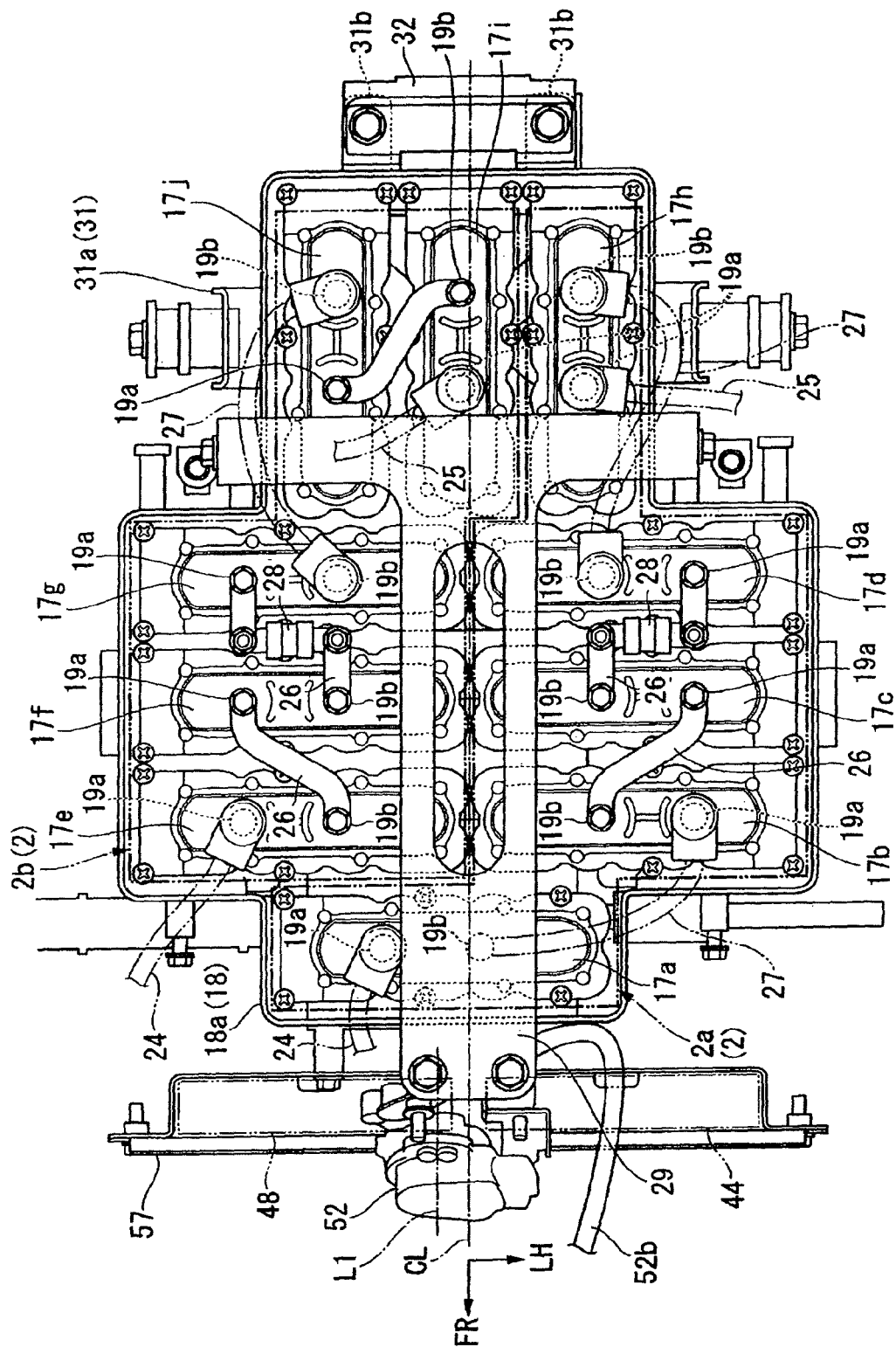
FIG. 8 is a top plan view of a main battery in the saddle seat type electric vehicle.

As shown in FIGS. 3, 4, and 8, the main battery 2 is composed of ten battery modules 17a to 17j accommodated in a battery case 18. The battery case 18 has a boxlike case body 18a having a substantially rectangular parallelepiped shape opening on the upper side and a case cover 18b for closing the upper opening of the case body 18a. The outer wall of the case body 18a is suitably formed with openings. FIG. 8 shows a condition where the case cover 18b is removed.

Each of the battery modules 17a to 17j is formed like a thick plate extending in the vertical direction. At the front end portion and the longitudinally intermediate portion of the main battery 2, some of the battery modules 17a to 17j are arranged so that the direction along the long sides of each battery module is perpendicular to the lateral direction of the vehicle. At the rear portion of the main battery 2, the other battery modules are arranged so that the direction along the long sides of each battery module is perpendicular to the longitudinal direction of the vehicle.

More specifically, at the front end portion of the main battery 2, the battery module 17a is arranged so as to cross a laterally central line CL. At the longitudinally intermediate portion of the main battery 2, the three battery modules 17b to 17d are arranged on the left side of the laterally central line CL in the longitudinal direction of the vehicle, and the three battery modules 17e to 17g are arranged on the right side of the laterally central line CL in the longitudinal direction of the vehicle. At the rear portion of the main battery 2, the three battery modules 17h to 17j are arranged on both sides of the laterally central line CL in the lateral direction of the vehicle. The six battery modules 17b to 17g at the longitudinally intermediate portion of the main battery 2 are arranged in symmetry with respect to the laterally central line CL. However, the battery module 17a at the front end portion of the main battery 2 and the battery modules 17h to 17j at the rear portion of the main battery 2 are arranged unsymmetrically so as to be slightly shifted from the laterally central line CL to the right side of the vehicle.

With this arrangement of the battery modules 17a to 17j, the lateral sizes of the longitudinally intermediate portions of the main battery 2 and the battery case 18 are made larger than those of the front end portions and the rear portions of the main battery 2 and the battery case 18. Accordingly, the main battery 2 and the battery case 18 can be well accommodated in the seat front cover 23 having an elliptical shape elongated in the longitudinal direction of the vehicle as viewed in plan (see FIG. 2). Furthermore, the lateral size of the rear portion of the seat front cover 23 can be suppressed to thereby facilitate knee grip.

Referring to FIG. 8, the battery modules 17a to 17j are spaced from each other to allow the flow of outside air (a flow of cooling air) entering the battery case 18. Each of the battery modules 17a to 17j is an energy storage that can be suitably charged and discharged. For example, a lithium ion battery, nickel metal hydride battery, and lead acid battery may be used as the battery modules 17a to 17j.

A positive terminal 19a and a negative terminal 19b project from the upper end of each of the battery modules 17a to 17j.

Of all the battery modules 17a to 17j, the battery module 17a at the front end portion of the main battery 2, the left battery modules 17b to 17d at the longitudinally intermediate portion of the main battery 2, and the left battery module 17h at the rear portion of the main battery 2 are connected in series to form a first battery pack 2a having a predetermined high voltage (48 to 72 V).

On the other hand, the right battery modules 17e to 17g at the longitudinally intermediate portion of the main battery 2 and the right battery modules 17i and 17j at the rear portion of the main battery 2 are connected in series to form a second battery pack 2b having a predetermined high voltage.

The first and second battery packs 2a and 2b are provided to individually supply electric power to first and second motor bodies 3a and 3b, respectively, which will be hereinafter described.

Output cables 24 extend from the positive electrodes for external output in the first and second battery packs 2a and 2b. Output cables 25 extend from the negative electrodes for external output in the first and second battery packs 2a and 2b. Interelectrode bridges 26 are provided for connecting the positive and negative electrodes in the first and second battery packs 2a and 2b. Cables 27 are provided for connecting the positive and negative electrodes in the first and second battery packs 2a and 2b. Fuses 28 are provided in the interelectrode bridges 26 in the first and second battery packs 2a and 2b. A fixing bracket 29 is provided for fixing the case cover 18b to the case body 18a. The two positive terminals 19a for external output in the main battery 2 are located on the same side as the side where a rotating shaft 52i of a potentiometer 52e of a throttle sensor 52 (to be hereinafter described) is located with respect to the laterally central line CL, i.e., on the right side of the laterally central line CL at the front portion of the main battery 2. Accordingly, the two output cables 24 connected to the two positive terminals 19a for external output are routed on the right side of the laterally central line CL.

Referring to FIGS. 3 and 4, the lower portion of the main battery 2 and the battery case 18 is disposed between the right and left main frames 13. The front portions of the right and left main frames 13 are formed with front and rear openings 13b and 13c passing in the lateral direction of the vehicle. These openings 13b and 13c are formed to adjust the rigidity of the body frame 11 as a whole. The front openings 13b are used as cooling air introducing openings for introducing a flow of cooling air to the main battery 2.

Referring also to FIGS. 1 and 2, outside air introducing ducts 21a extend to the front from the front openings 13b, and the front ends of the outside air introducing ducts 21a open to the front side of the vehicle at the front end of the cowling 21. Accordingly, a flow of air (cooling air) is supplied through the outside air introducing ducts 21a to the main battery 2 disposed between the right and left main frames 13.

Figure 10:
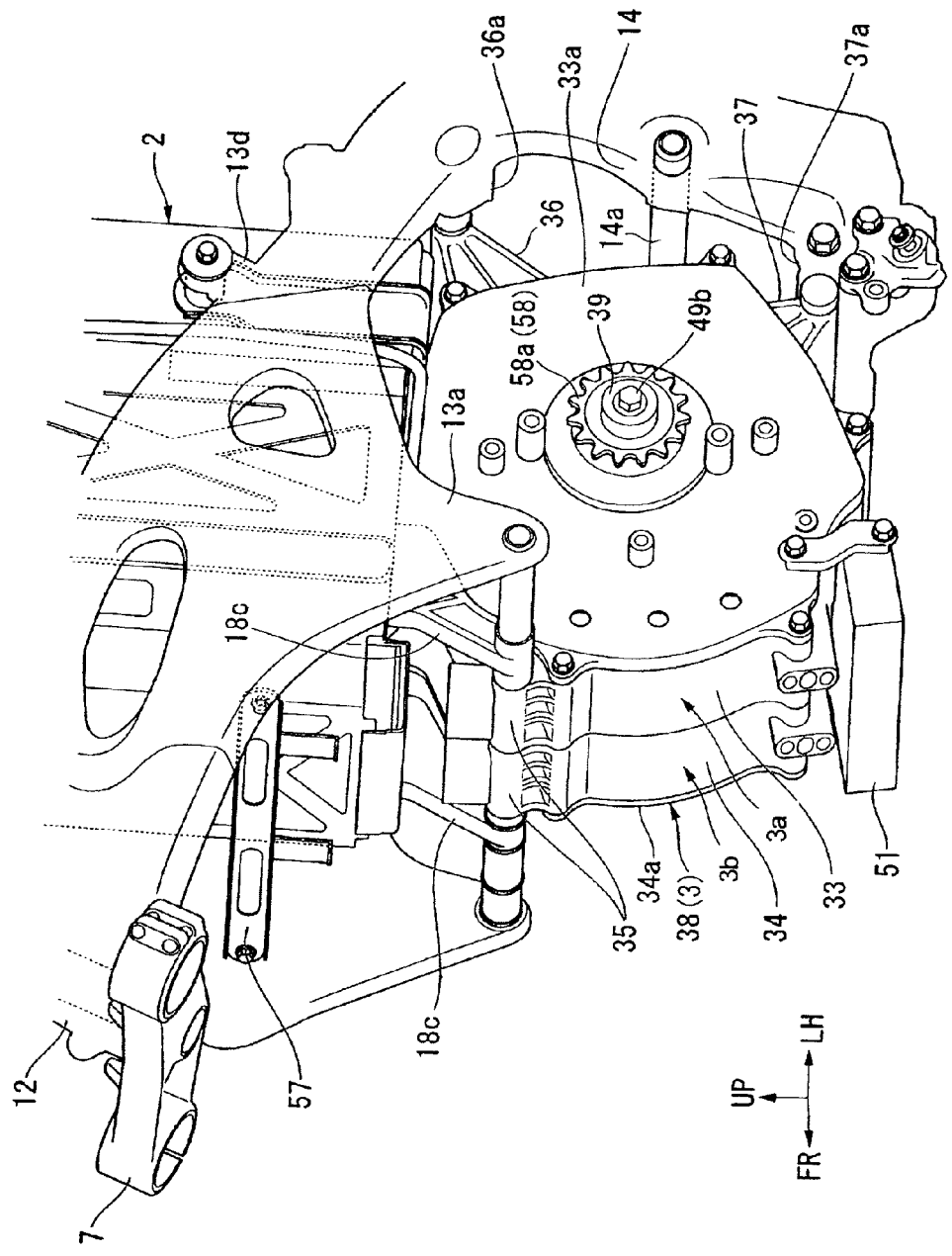
FIG. 10 is a perspective view of a drive motor and its periphery in the saddle seat type electric vehicle as viewed from the left front side thereof.

As shown in FIGS. 3 and 10, a pair of right and left battery front support arms 18c extend downwardly from the lower surface of the front portion of the battery case 18 so as to be inclined towards the front. The lower end portions of the right and left battery front support arms 18c are supported and fixed by a bolt to the lower end portions of the right and left motor hangers 13a of the body frame 11 together with motor front support portions 35 which will be hereinafter described.

Figure 6:
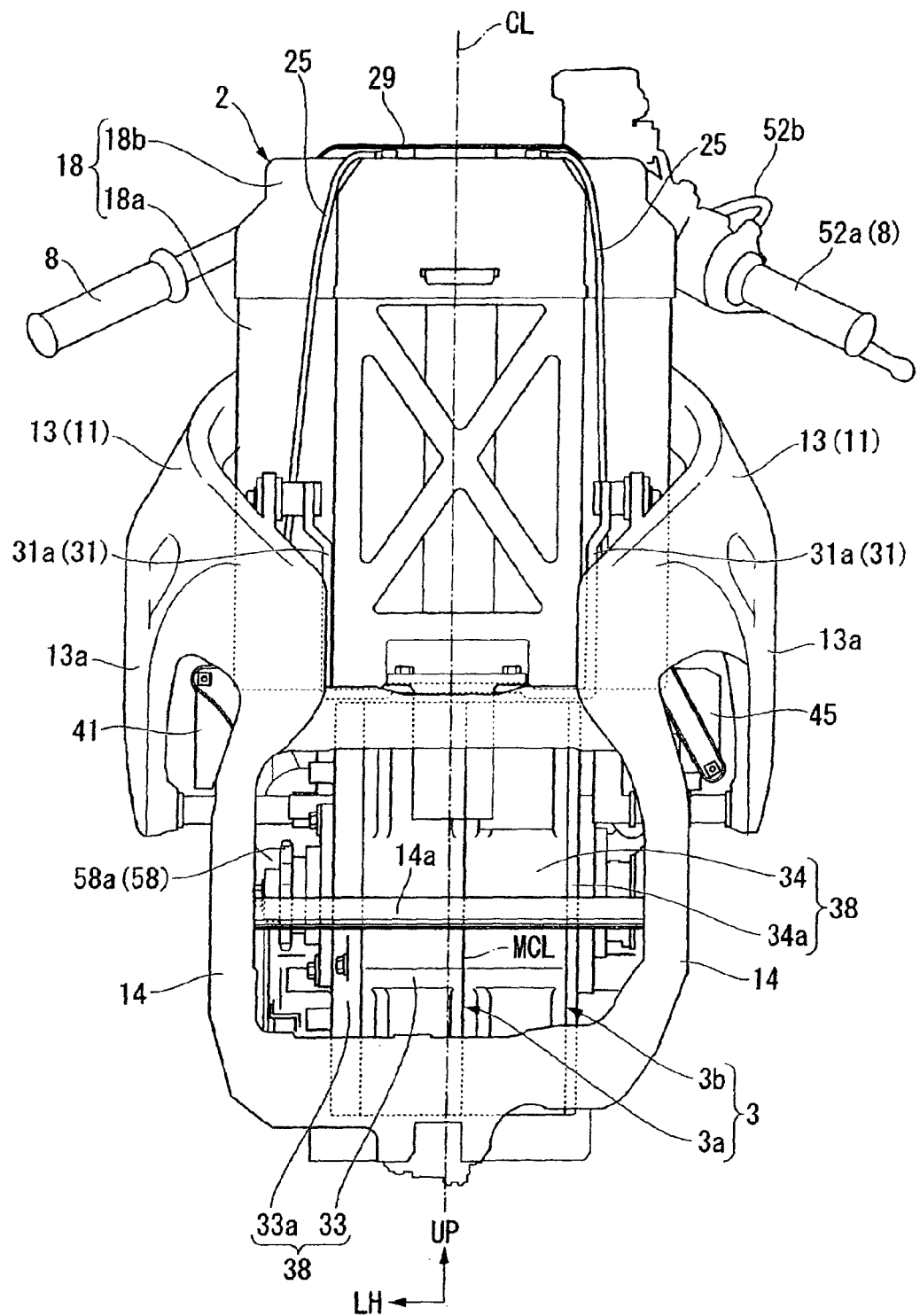
FIG. 6 is a rear elevation of the essential part of the saddle seat type electric vehicle.

As shown in FIGS. 3 and 6, the rear portion of the battery case 18 is supported through a pair of right and left battery rear support brackets 31 to the body frame 11. Each of the right and left battery rear support brackets 31 has a striplike L-shaped bracket body 31a bent so as to extend along the side surface and lower surface of the battery case 18 and a connecting portion 31*b* extending to the rear from the lower portion of the bracket body 31*a*. The upper ends of the bracket bodies 31*a* of the right and left battery rear support brackets 31 are supported and fixed by bolts to battery support projections 13*d* formed on the upper surfaces of the rear portions of the right and left main frames 13. Accordingly, the battery case 18 is fixed through the battery front support arms 18*c* and the battery rear support brackets 31 to the body frame 11 together with the drive motor 3. Thus, the main battery 2 and the battery case 18 are fixedly supported to the body frame 11.

As shown in FIGS. 1 and 3, the drive motor 3 is accommodated in a space surrounded by the main frames 13, the pivot frames 14, and the motor hangers 13*a* as viewed in side elevation of the vehicle. The drive motor 3 has a single drive shaft 39 extending in the lateral direction at the central position as viewed in side elevation (see FIG. 3). The center line (axis, which corresponds to the center of gravity of the drive motor 3) C1 of the drive shaft 39 is higher in level than the center line (axis) C2 of the pivot shaft 14*a*.

Figure 11:
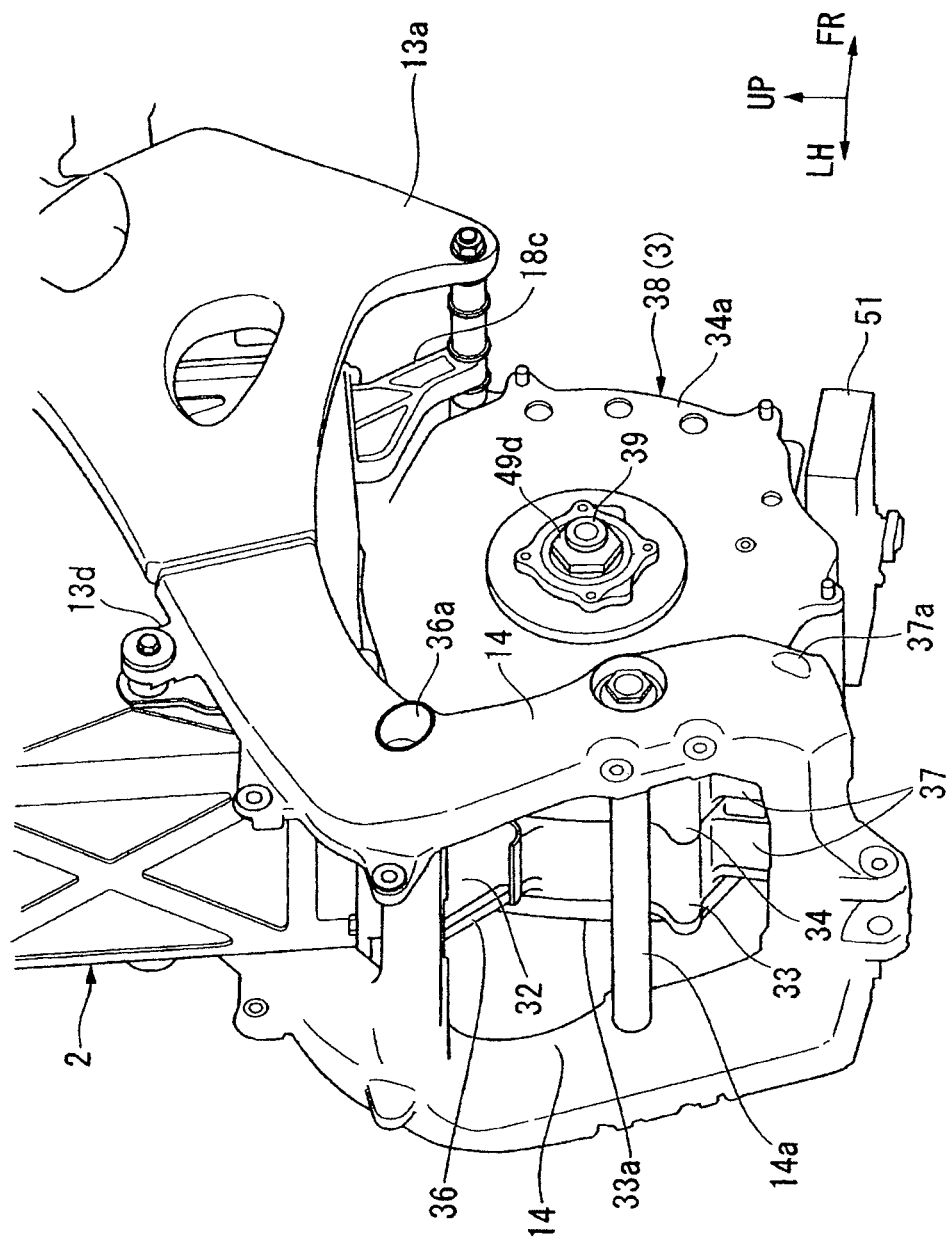
FIG. 11 is a perspective view of the drive motor and its periphery as viewed from the right rear side thereof.

Referring also to FIGS. 10 and 11, the drive motor 3 has a pair of left and right motor bodies (individual motors) 3*a* and 3*b* each having a flat shape reduced in lateral size (axial size). These left and right motor bodies 3*a* and 3*b* are juxtaposed in the lateral direction and connected coaxially, thereby allowing integral driving. The lateral size of the drive motor 3 is smaller than the spacing between the right and left main frames 13 and the spacing between the right and left pivot frames 14. The left motor body 3*a* will be hereinafter referred to as a first motor body 3*a*, and the right motor body 3*b* will be hereinafter referred to as a second motor body 3*b*. The joining surface between the motor bodies 3*a* and 3*b* corresponds to the lateral center of the drive motor 3, and this lateral center is denoted by MCL as a motor lateral center line in FIG. 6.

Figure 9:
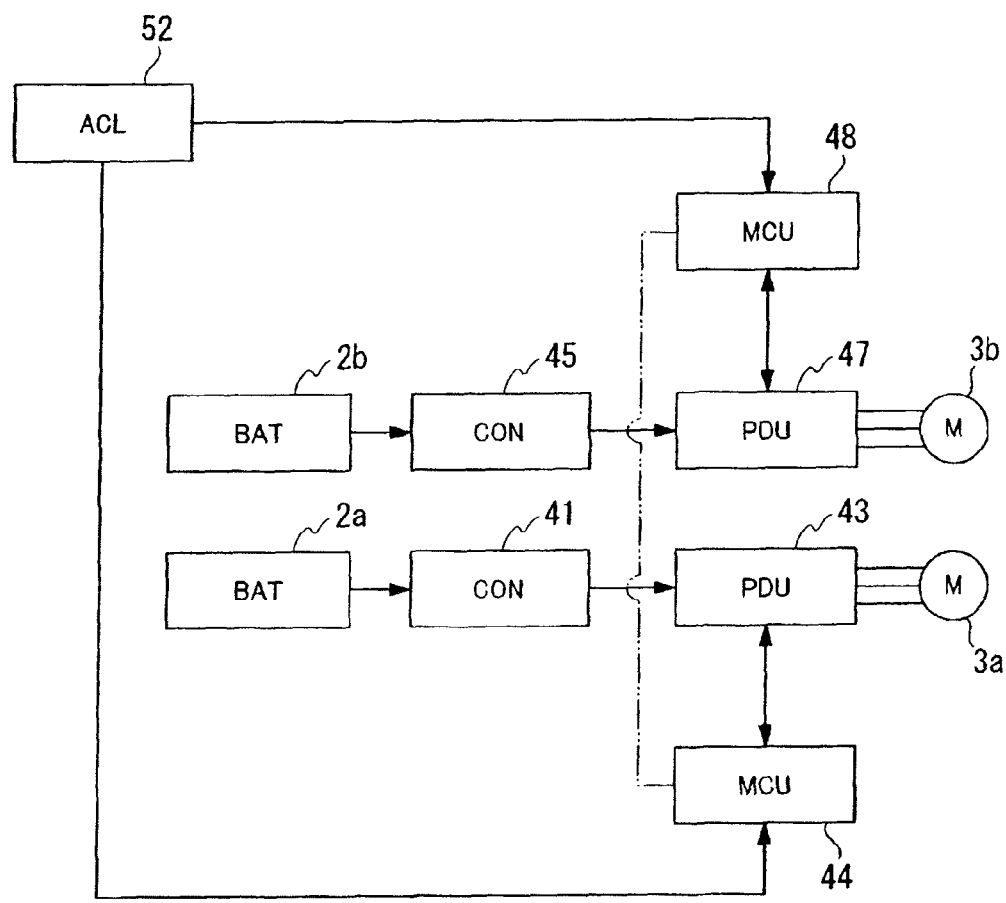
FIG. 9 is a block diagram showing a main configuration of the saddle seat type electric vehicle.

As shown in FIG. 9, the electric power from the first battery pack 2*a* is supplied through a first contactor 41 interlocking with a main switch (not shown) to a first PDU (power driver unit) 43 as a motor driver. The electric power is converted from a direct current to a three-phase alternating current in the first PDU 43, and thereafter supplied to the first motor body 3*a* as a three-phase AC motor.

Similarly, the electric power from the second battery pack 2*b* is supplied through a second contactor 45 interlocking with the main switch to a second PDU 47 as a motor driver. The electric power is converted from a direct current to a three-phase alternating current in the second PDU 47, and thereafter supplied to the second motor body 3*b* as a three-phase AC motor.

Figure 7:
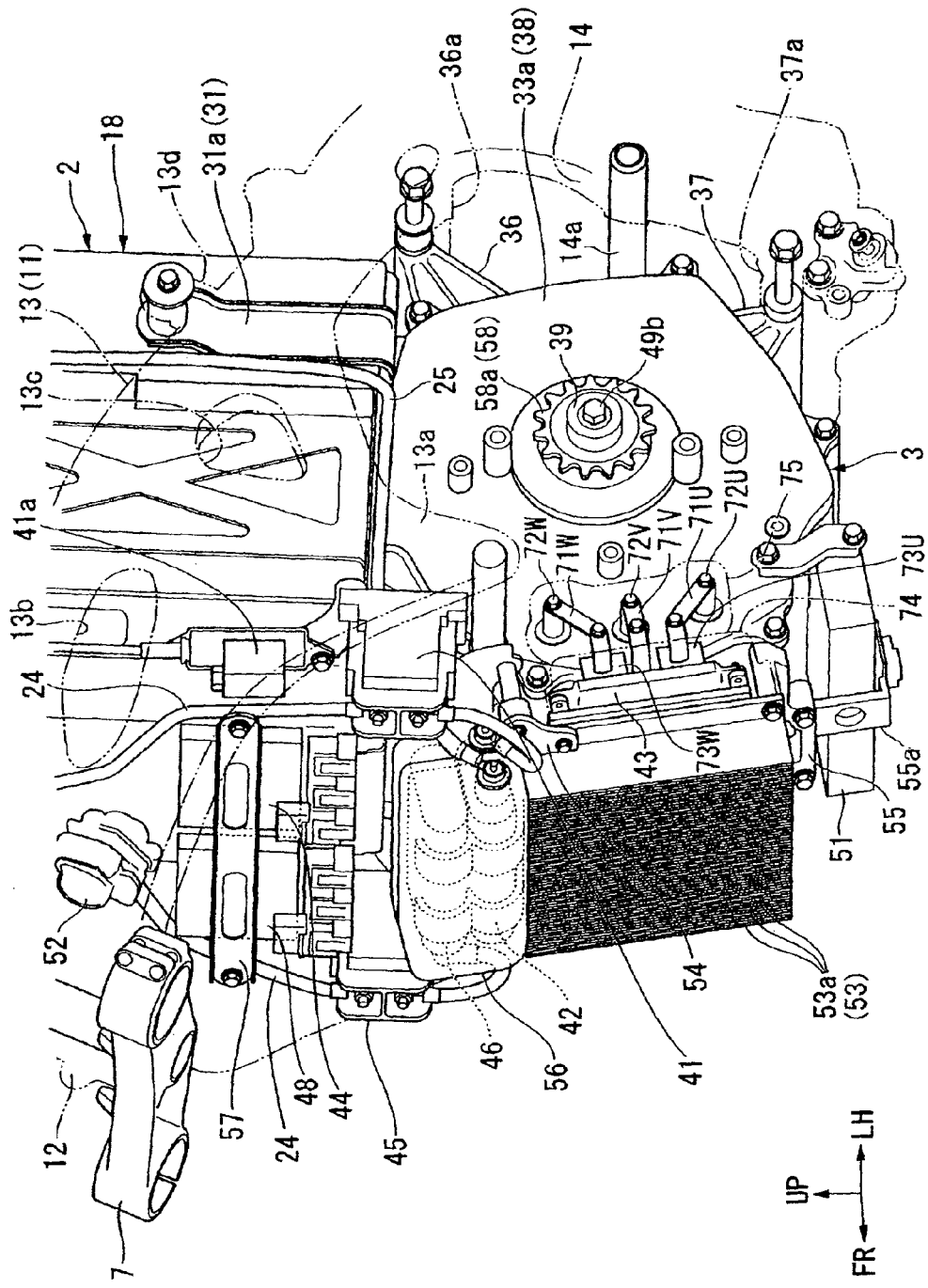
FIG. 7 is a perspective view of the essential part of the saddle seat type electric vehicle as viewed from the left front side thereof.

Referring to FIG. 7, a sub battery 51 having a voltage of 12 V is located below the front portion of the drive motor 3. Electric power is supplied from the sub battery 51 to general electric equipment such as lighting parts and control system equipment such as an ECU (electric control unit).

A first MCU (motor control unit) 44 as an ECU is connected to the first PDU 43, and a second MCU 48 as an ECU is connected to the second PDU 47. An output request signal from a throttle (accelerator) sensor 52 is input into the MCUs 44 and 48. According to this output request signal, the MCUs 44 and 48 individually control the motor bodies 3*a* and 3*b* through the PDUs 43 and 47, respectively. While mutual supervision or communication between the MCUs 44 and 48 is not performed in this preferred embodiment, the MCUs 44 and 48 may be connected so as to allow communication therebetween as shown by a phantom line in FIG. 9, so that the outputs from the motor bodies 3*a* and 3*b* may be supervised or may be subjected to cooperative control or independent control.

In the saddle seat type electric vehicle 1 according to this preferred embodiment, the main battery 2 is charged in the condition where it remains mounted on the vehicle and it is exposed by removing the seat front cover 23. Alternatively, the main battery 2 is charged in the condition where it is demounted from the vehicle.

Figure 5:
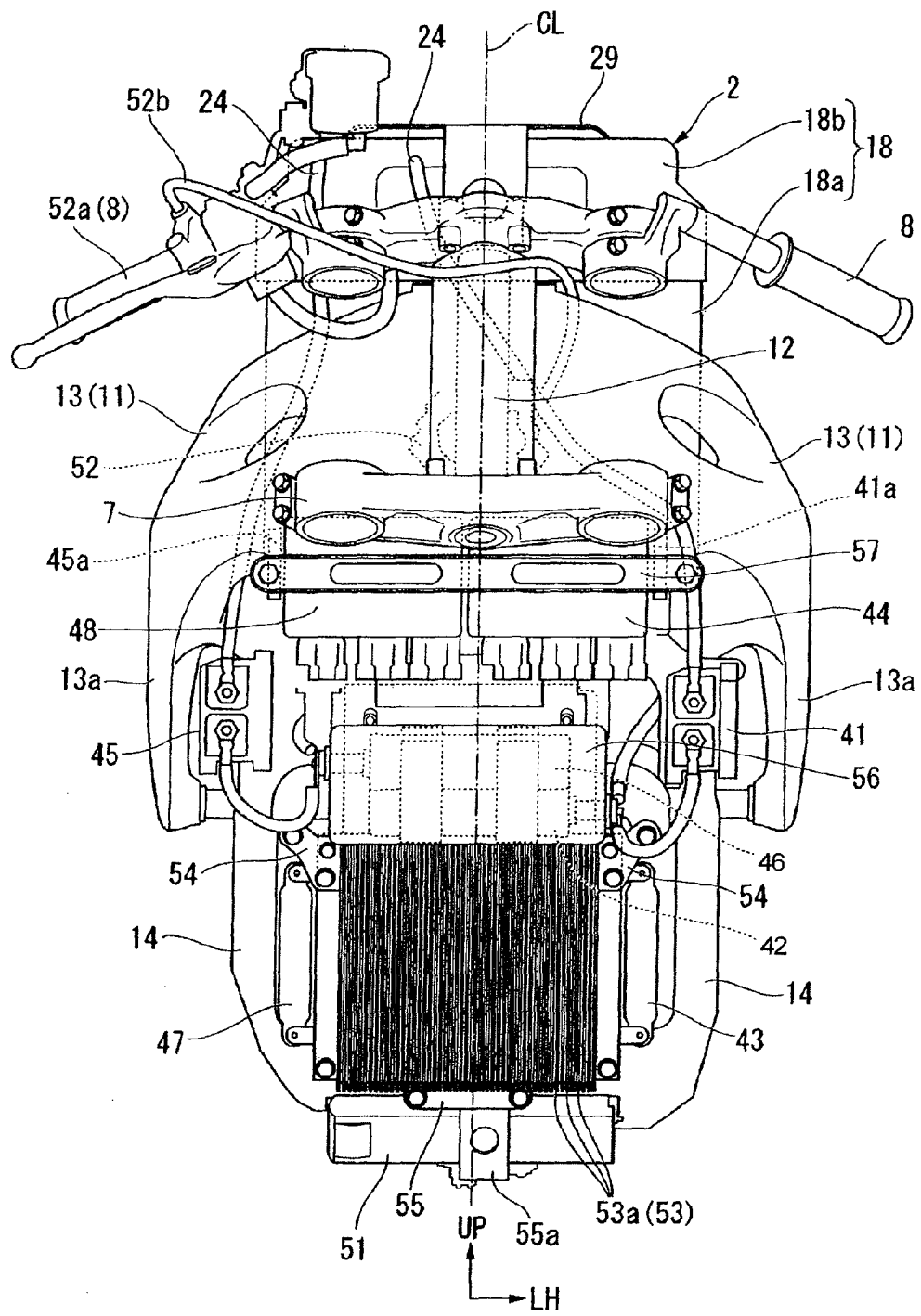
FIG. 5 is a front elevation of the essential part of the saddle seat type electric vehicle.

As shown in FIGS. 3, 5, and 7, the PDUs 43 and 47 respectively corresponding to the motor bodies 3*a* and 3*b* are located on the front side of the front end portion of the drive motor 3 so as to be arranged in the lateral direction of the vehicle. Each of the PDUs 43 and 47 is formed like a thick plate and extends substantially vertically in such a manner that the thickness direction of each PDU is substantially perpendicular to the lateral direction of the vehicle (more specifically, the thickness direction of each PDU is slightly inclined downward toward the front side of the vehicle). A platelike heat sink 53 is located immediately on the front side of the PDUs 43 and 47 so as to be parallel to the PDUs 43 and 47.

The front surface of the heat sink 53 has many radiation fins 53*a* extending in the vertical direction. The front surfaces of the PDUs 43 and 47 are in contact with the rear surface of the heat sink 53. The upper portion of the heat sink 53 is supported through upper brackets 54 to the upper portion of a motor case 38 of the drive motor 3, and the lower portion of the heat sink 53 is supported through a lower bracket 55 to the lower portion of the motor case 38. The lower bracket 55 is integrally formed with a battery support stay 55*a* for supporting the sub battery 51. The battery support stay 55*a* has an L-shaped structure bent along the front surface and lower surface of the sub battery 51 as viewed in side elevation.

First and second capacitors 42 and 46 respectively corresponding to the contactors 41 and 45 and the PDUs 43 and 47 are provided above the heat sink 53. Each of the capacitors 42 and 46 is a rodlike member extending in the lateral direction of the vehicle and having an elliptical cross section elongated in the longitudinal direction of the vehicle. The capacitors 42 and 46 are arranged in parallel in the vertical direction above the heat sink 53. The capacitors 42 and 46 are accommodated in a capacitor case 56.

The contactors 41 and 45 are located on the laterally outside of the capacitors 42 and 46 at positions on the rear upper side of the capacitors 42 and 46 as viewed in side elevation. Each of the contactors 41 and 45 has a substantially boxlike shape. The left contactor 41 is disposed between the capacitors 42 and 46 and the left motor hanger 13*a*, and the right contactor 45 is disposed between the capacitors 42 and 46 and the right motor hanger 13*a*. A pair of relatively small-sized precharge contactors 41*a* and 45*a* are provided above the contactors 41 and 45, respectively.

The MCUs 44 and 48 are located above the contactors 41 and 45 on the front side of the lower portion of the main battery 2 so as to be juxtaposed in the lateral direction of the vehicle. Each of the MCUs 44 and 48 has a boxlike shape reduced in thickness in the longitudinal direction of the vehicle. The MCUs 44 and 48 are supported to an MCU support bracket 57 fixed to the front surface of the lower portion of the battery case 18.

The throttle sensor 52 fixed to the body frame 11 on the rear side of the head pipe 12 is located above the MCUs 44 and 48. The throttle sensor 52 is connected through a throttle cable 52*b* to a right grip 52*a* as an accelerator throttle rotatably mounted on the handle 8. The rotational operation of the right grip 52*a* is mechanically transmitted through the throttle cable 52*b* to the throttle sensor 52. A control signal according to this rotational operation is output from the throttle sensor 52 to the MCUs 44 and 48.

As shown in FIG. 1, the left end portion of the drive shaft 39 projects to the left from the central portion of a left case cover 33a of the drive motor 3, and a drive sprocket 58a is mounted on this projecting portion of the drive shaft 39. A driven sprocket 58b is mounted on the left side of the rear wheel 4, and a drive chain 58c is wrapped between the drive sprocket 58a and the driven sprocket 58b. Thus, the drive sprocket 58a, the driven sprocket 58b, and the drive chain 58c constitute a chain type power transmitting mechanism 58 for transmitting a drive force from the drive motor 3 to the rear wheel 4.

The drive motor 3 is driven at a variable speed by VVVF (variable voltage variable frequency) control, for example. The rotational speed of the drive motor 3 is detected by rotation sensors (not shown) that will be hereinafter described.

Referring to FIG. 3 and FIGS. 5 to 7, three feeding terminals 72u, 72v, and 72w are provided at the front end portion of each of the case covers 33a and 34a of the drive motor 3. The three feeding terminals 72u, 72v, and 72w are respectively connected to three feeding members 71u, 71v, and 71w extending rearward from the laterally outer end of each of the PDUs 43 and 47. The feeding members 71u, 71v, and 71w and the feeding terminals 72u, 72v, and 72w respectively correspond to U-phase, V-phase, and W-phase arranged from the lower side. The electric current from the PDU 43 is supplied through the feeding members 71u, 71v, and 71w and the feeding terminals 72u, 72v, and 72w to the stator coil in the motor body 3a. Similarly, the electric current from the PDU 47 is supplied through the feeding members 71u, 71v, and 71w and the feeding terminals 72u, 72v, and 72w to the stator coil in the motor body 3b.

Current sensors 73u and 73w are provided at the base ends of the feeding members 71u and 71w of U-phase and W-phase in each of the PDUs 43 and 47. Each of the PDUs 43 and 47 is covered with a driver cover 74, and the feeding members 71u, 71v, and 71w and the feeding terminals 72u, 72v, and 72w for each PDU are covered with a feeding portion cover 75.

Figure 12:
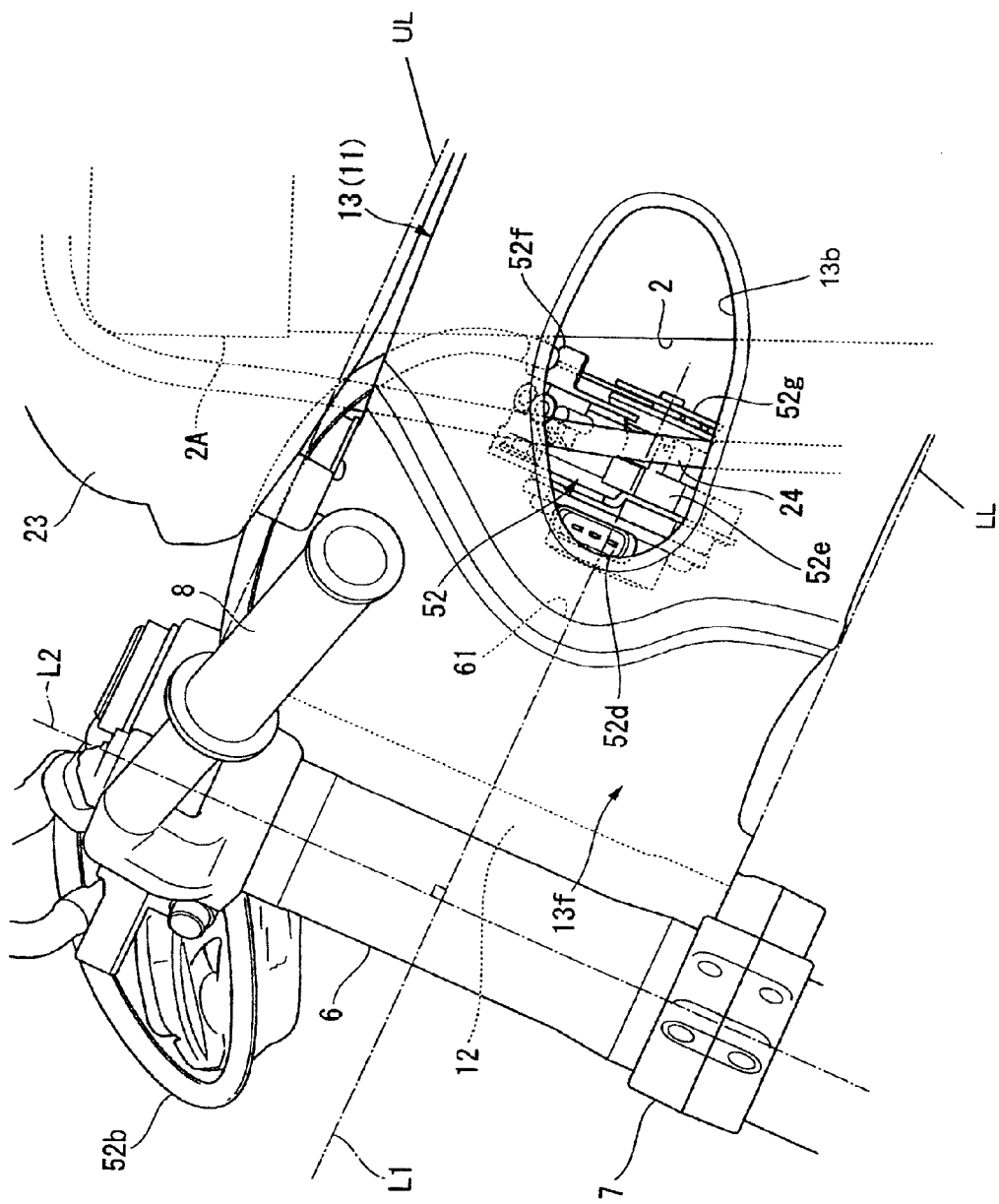
FIG. 12 is an enlarged left side view of the front portions of right and left main frames in the saddle seat type electric vehicle.
Figure 13:
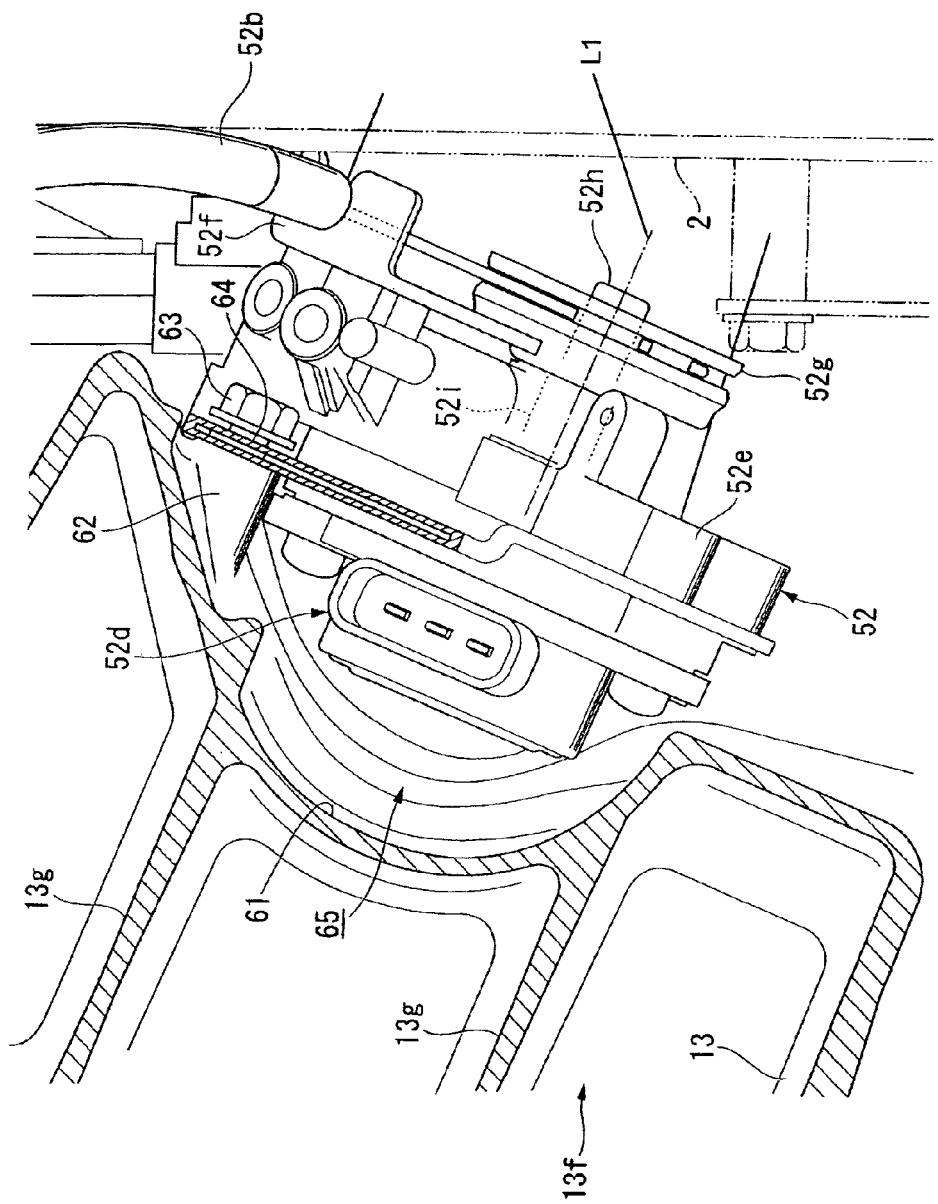
FIG. 13 is a sectional view taken along a laterally central line in the saddle seat type electric vehicle.

As shown in FIGS. 12 and 13, a joint portion 13f constituting the body frame 11 is formed integrally with the head pipe 12 on the rear side thereof. The joint portion 13f has a hollow structure including a plurality of internal partition wall portions 13g for reinforcement. The lateral size of the joint portion 13f is increased toward the rear side of the vehicle as viewed in plan (see FIG. 4), and the front end portions of the right and left main frames 13 are connected to the rear ends of the right and left portions of the joint portion 13f.

The rear end of the joint portion 13f is formed with a curved surface 61 concave toward the front side of the vehicle at a laterally central and vertically central position. The upper portion of the curved surface 61 is formed with a boss 62 projecting substantially parallel to the direction of extension of the main frames 13. The upper portion of the throttle sensor 52 is formed with a mounting flange 64. The mounting flange 64 is mounted to the boss 62 by a fastening bolt 63 substantially parallel to the direction of extension of the main frames 13. Thus, the throttle sensor 52 is located near the rear portion of the head pipe 12 and between the right and left main frames 13 and mounted to the joint portion 13f as a component of the body frame 11.

The main battery 2 is located on the rear side of the throttle sensor 52 disposed between the right and left main frames 13 so as to cross the main frames 13 as viewed in side elevation. Accordingly, the throttle sensor 52 is located in an area surrounded by the front surface 2A of the main battery 2, the right and left main frames 13, and the head pipe 12. More specifically, the throttle sensor 52 is located so as to overlap the main frames 13 as viewed in side elevation and to be exposed to the front openings 13b of the right and left main frames 13. Further, the throttle sensor 52 is located so as to fall within the vertical size of the head pipe 12 (the distance between the phantom lines UL and LL in FIG. 12).

The front portion of the seat front cover 23 is fastened through brackets to the main frames 13 at a position above the throttle sensor 52. Accordingly, the upper side of the space for accommodating the throttle sensor 52 is covered with the front portion of the seat front cover 23. The output cable 24 extending from the front end portion of the seat front cover 23 is routed through the space on the left side of the throttle sensor 52 toward the lower side of the main battery 2. The route of this output cable 24 is not limited to the left side of the throttle sensor 52, but may be changed to the right side of the throttle sensor 52, for example.

The throttle sensor 52 includes a connector 52d to which a main harness (not shown) in the vehicle is connected and a potentiometer 52e for detecting the operational amount of the accelerator. The connector 52d is located on the front side of the flange 64. In the condition where the flange 64 is fastened to the boss 62, the connector 52d is located in a space 65 formed by the curved surface 61 of the joint portion 13f. The connector 52d shown in FIGS. 12 and 13 is a female connector opening to the left upper side of the vehicle, and a male connector of the main harness connected to the MCUs 44 and 48 is engaged into the connector 52d.

The throttle cable 52b for connecting the right grip 52a as an accelerator throttle to the potentiometer 52e for detecting the operational amount of the accelerator is routed from the front side of the head pipe 12 toward the rear side of the head pipe 12. More specifically, the throttle cable 52b is routed from the front side of the head pipe 12, next through the space between the head pipe 12 and the left front fork 6, next along the upper side of the joint portion 13f, and finally along the rear side of the joint portion 13f. The rear end of the outer cable of the throttle cable 52b is supported to a cable support bracket 52f provided at the rear portion of the potentiometer 52e.

The rear end of the inner cable of the throttle cable 52b is formed with a hook (not shown). This hook is engaged with a cable drum 52g, and the rear end portion of the inner cable is wound around the cable drum 52g. The cable drum 52g is rotatable by pushing or pulling the inner cable and is normally biased in an accelerator closing direction. The cable drum 52g has a rotating shaft 52h extending in the longitudinal direction of the vehicle. More specifically, the axis L1 of the rotating shaft 52h extends in the longitudinal direction of the vehicle so as to be slightly inclined downward toward the rear side of the vehicle.

The rotating shaft 52h of the cable drum 52g is connected to the rotating shaft 52i of the potentiometer 52e. The axis of the rotating shaft 52h coincides with the axis of the rotating shaft 52i (as shown by a phantom line L1 in FIG. 13). That is, like the rotating shaft 52h mentioned above, the rotating shaft 52i of the potentiometer 52e extends in the longitudinal direction of the vehicle. More specifically, the axis of the rotating shaft 52i extends in the longitudinal direction of the vehicle so as to be inclined downwardly toward the rear side of the vehicle. Further, as shown in FIG. 12, the axis L1 of the rotating shaft 52i is perpendicular to the axis L2 of the head pipe 12 as viewed in side elevation.

When the right grip 52a is rotationally operated by the operator, the inner cable of the throttle cable 52b is pushed or pulled, so that the rotational amount of the cable drum 52g is changed. This change in the rotational amount is detected by the potentiometer 52e. That is, this change in the rotational amount is converted into an electrical signal as the operational amount of the right grip 52a, and the electrical signal is output to the MCUs 44 and 48. In FIGS. 12 and 13, the main harness connected to the connector 52d is not shown for the convenience of illustration.

According to the throttle sensor mounting structure in the preferred embodiment mentioned above, the throttle sensor 52 is located between the right and left main frames 13 extending to the rear from the head pipe 12 so as to be superimposed on the main frames 13 as viewed in a side elevation. Accordingly, the right and left sides of the throttle sensor 52 are covered with the main frames 13, so that it is possible to prevent that an external force may be applied to the throttle sensor 52 from the right and left sides thereof, thereby protecting the throttle sensor 52.

The throttle sensor 52 is located on the rear side of the head pipe 12. Accordingly, the throttle sensor 52 has no influence on the arrangement of the headlight 10, and the influence on the steering operation can be suppressed.

In the case that the vehicle is a sport type motorcycle, the degree of lateral divergence of the right and left main frames 13 is large, so that a dead space is formed between the head pipe 12 and the main battery 2 located between the right and left main frames 13. Accordingly, the throttle sensor 52 can be located by effectively using this dead space.

The axis of the rotating shaft 52i of the potentiometer 52e extends in the longitudinal direction of the vehicle, and the throttle cable 52b is routed through the front side of the head pipe 12 toward the rear side of the head pipe 12. Accordingly, the throttle cable 52b can retain sufficient flexibility, so that the application of a large bending force to the throttle cable 52b in the steering operation can be suppressed.

The throttle sensor 52 is located so as to fall within the vertical size of the head pipe 12. Accordingly, the dead space immediately on the rear side of the head pipe 12 can be effectively used.

The main battery 2 is located between the right and left main frames 13 so as to cross the main frames 13 as viewed in side elevation. Further, the throttle sensor 52 is located in the area surrounded by the front surface 2A of the main battery 2, the main frames 13, and the head pipe 12. Accordingly, it is possible to prevent that an external force may be applied to the throttle sensor 52 from the front side, the right and left sides, and the rear side thereof, thereby protecting the throttle sensor 52 more reliably. Further, the dead space between the main battery 2 and the main frames 13 can be effectively used.

Further, the front openings 13b are formed at the front portions of the right and left main frames 13. Accordingly, the weight of the main frames 13 can be reduced and the throttle sensor 52 can be accessed through the front openings 13b, thereby improving the maintainability.

Further, the axis L1 of the rotating shaft 52i of the potentiometer 52e is perpendicular to the axis L2 of the head pipe 12. Accordingly, the throttle cable 52b for connecting the right grip 52a and the throttle sensor 52 can be flexed at at least two positions, i.e., on the front side and the rear side of the head pipe 12. As a result, in the steering operation, it is possible to reduce a compressive or extensive force applied to the cable support bracket 52f of the throttle sensor 52 to which the throttle cable 52b is connected. Accordingly, as compared with the case that the axis L1 of the rotating shaft 52i of the potentiometer 52e is not perpendicular to the axis L2 of the head pipe 12, the influence due to the displacement of the throttle cable 52b in the steering operation can be suppressed.

Further, even in the case that the headlight 10 is located on the front side of the head pipe 12 and it is therefore difficult to ensure a sufficient space for locating the throttle sensor 52 on the front side of the head pipe 12, a sufficient space for locating the throttle sensor 52 can be ensured on the rear side of the head pipe 12.

The present invention is not limited to the above preferred embodiment, but various modifications may be made without departing from the scope of the present invention.

For example, while the saddle seat type electric vehicle according to the present invention is applied to a sport type motorcycle in the above preferred embodiment, the present invention is applicable to a saddle seat type electric vehicle having a pair of right and left main frames. Further, the saddle seat type electric vehicle according to the present invention includes various vehicles having a configuration such that an operator can straddle a vehicle body. These vehicles include a motorcycle (including a motor bike and a scooter type vehicle), a three-wheeled vehicle (including a vehicle having one front wheel and two rear wheels and a vehicle having two front wheels and one rear wheel), and a four-wheeled vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A throttle sensor mounting structure in a saddle seat vehicle comprising:
   a handle;
   a throttle grip rotatably mounted on said handle;
   a throttle sensor for detecting an operational amount of said throttle grip;
   a controller for controlling a power unit according to a detection value from said throttle sensor; and
   a pair of right and left main frames extending rearward from a head pipe;
   wherein said throttle sensor is located on a rear side of said head pipe and between said right and left main frames so that at least a part of said throttle sensor is superimposed on said main frames as viewed in a side elevation,
   wherein said throttle sensor includes a potentiometer;
   an axis of a rotating shaft of said potentiometer extends in a longitudinal direction of said vehicle; and
   a throttle cable for connecting said throttle grip and said potentiometer is routed from a front side of said head pipe toward said rear side of said head pipe.

2. The throttle sensor mounting structure according to claim 1, wherein the axis of said rotating shaft is perpendicular to the axis of said head pipe as viewed in side elevation.

3. The throttle sensor mounting structure according to claim 1, wherein an external connection terminal of a driving battery is located on the right or left side of a laterally central line of said vehicle; and
   the axis of said rotating shaft is located on the same side as the side where said external connection terminal is located with respect to said laterally central line.

4. The throttle sensor mounting structure according to claim 1, wherein said throttle sensor is located so as to fall within the vertical size of said head pipe.

5. The throttle sensor mounting structure according to claim 1, wherein said driving battery is located between said right and left main frames so as to cross said main frames as viewed in a side elevation; and
   said throttle sensor is located in an area surrounded by the front surface of a driving battery, said right and left main frames, and said head pipe.

6. The throttle sensor mounting structure according to claim 1, wherein openings are formed at the front portions of said right and left main frames; and said throttle sensor is exposed to said openings as viewed in side elevation.

7. The throttle sensor mounting structure according to claim 1, wherein a headlight is provided on the front side of said head pipe.

8. A throttle sensor mounting structure in a saddle seat vehicle, comprising:

a throttle grip manually actuated and rotatably mounted;

a throttle sensor for detecting a rotational movement of said throttle grip;

a controller for controlling a power unit according to a detected value from said throttle sensor; and a pair of right and left main frames extending rearward, said pair of right and left main frames having a predetermined height;

said throttle sensor being located in a space between said right and left main frames wherein at least a part of said throttle sensor is superimposed to overlap the predetermined height of the pair of right and left main frames as viewed in a side elevation, wherein said throttle sensor is located so as to fall within the vertical size of said head pipe.

9. The throttle sensor mounting structure according to claim 8, wherein said driving battery is located between said right and left main frames so as to cross said main frames as viewed in a side elevation; and said throttle sensor is located in an area surrounded by the front surface of a driving battery, said right and left main frames, and said head pipe.

10. The throttle sensor mounting structure according to claim 8, wherein openings are formed at the front portions of said right and left main frames; and said throttle sensor is exposed to said openings as viewed in side elevation.

11. The throttle sensor mounting structure according to claim 8, wherein a headlight is provided on the front side of said head pipe.

12. A throttle sensor mounting structure in a saddle seat vehicle comprising:

a throttle grip manually actuated and rotatably mounted;

a throttle sensor for detecting a rotational movement of said throttle grip;

a controller for controlling a power unit according to a detected value from said throttle sensor; and a pair of right and left main frames extending rearward, said pair of right and left main frames having a predetermined height;

said throttle sensor being located in a space between said right and left main frames wherein at least a part of said throttle sensor is superimposed to overlap the predetermined height of the pair of right and left main frames as viewed in a side elevation, wherein said throttle sensor includes a potentiometer;

an axis of a rotating shaft of said potentiometer extends in a longitudinal direction of said vehicle; and a throttle cable for connecting said throttle grip and said potentiometer is routed from a front side of a head pipe toward the rear side of said head pipe.

13. The throttle sensor mounting structure according to claim 12, wherein an external connection terminal of a driving battery is located on the right or left side of a laterally central line of said vehicle; and the axis of said rotating shaft is located on the same side as the side where said external connection terminal is located with respect to said laterally central line.

14. The throttle sensor mounting structure according to claim 12, wherein said throttle sensor is located so as to fall within the vertical size of said head pipe.

15. The throttle sensor mounting structure according to claim 12, wherein said driving battery is located between said right and left main frames so as to cross said main frames as viewed in a side elevation; and said throttle sensor is located in an area surrounded by the front surface of a driving battery, said right and left main frames, and said head pipe.

16. The throttle sensor mounting structure according to claim 12, wherein openings are formed at the front portions of said right and left main frames; and said throttle sensor is exposed to said openings as viewed in side elevation.

17. The throttle sensor mounting structure according to claim 12, wherein a headlight is provided on the front side of said head pipe.

* * * * *